(12) United States Patent
Meylan et al.

(10) Patent No.: US 8,358,669 B2
(45) Date of Patent: Jan. 22, 2013

(54) CIPHERING SEQUENCE NUMBER FOR AN ADJACENT LAYER PROTOCOL IN DATA PACKET COMMUNICATIONS

(75) Inventors: Arnaud Meylan, San Diego, CA (US); Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 12/112,431

(22) Filed: Apr. 30, 2008

(65) Prior Publication Data

US 2008/0273537 A1  Nov. 6, 2008

Related U.S. Application Data

(60) Provisional application No. 60/915,404, filed on May 1, 2007, provisional application No. 60/916,261, filed on May 4, 2007.

(51) Int. Cl.
*H04L 12/28* (2006.01)
*H04L 12/56* (2006.01)
*H04J 3/24* (2006.01)

(52) U.S. Cl. .................. 370/474; 370/389; 370/394
(58) Field of Classification Search .................. 370/389, 370/394, 474
See application file for complete search history.

(56) References Cited

U.S. PATENT DOCUMENTS

| | | | |
|---|---|---|---|
| 6,904,016 B2 | 6/2005 | Kuo et al. | |
| 7,675,941 B2 | 3/2010 | Kim et al. | |
| 7,817,669 B2 | 10/2010 | Pani et al. | |
| 7,873,075 B2 | 1/2011 | Rinne | |
| 8,064,460 B2 | 11/2011 | Tseng | |
| 2002/0024972 A1 | 2/2002 | Yi et al. | |
| 2002/0048281 A1 | 4/2002 | Yi et al. | |
| 2002/0089984 A1* | 7/2002 | Jiang | 370/394 |
| 2002/0097723 A1 | 7/2002 | Tourunen et al. | |
| 2003/0091048 A1 | 5/2003 | Jiang | |
| 2004/0233878 A1 | 11/2004 | Liu et al. | |
| 2005/0008035 A1 | 1/2005 | Eklund et al. | |
| 2006/0007952 A1 | 1/2006 | Oishi et al. | |
| 2006/0062323 A1 | 3/2006 | Yi et al. | |
| 2006/0221965 A1 | 10/2006 | Bosch et al. | |
| 2007/0047582 A1 | 3/2007 | Malkamaki | |

(Continued)

FOREIGN PATENT DOCUMENTS

CN  1868157 A  7/2011
EP  1689134 A2  8/2006

(Continued)

OTHER PUBLICATIONS

International Search Report—PCT/US08/062293, International Search Authority—European Patent Office—Aug. 21, 2008.

(Continued)

*Primary Examiner* — Ayaz Sheikh
*Assistant Examiner* — Tarell Hampton
(74) *Attorney, Agent, or Firm* — Kam T Tam

(57) ABSTRACT

A data packet communication system employs data encryption in a packet data convergence protocol (PDCP) and radio link control (RLC) in Layer 2 of transmission between a transmitter (TX) and a receiver (RX). A single sequence number is used for both the PDCP and RLC to reduce overhead by signaling a TX PDCP first ciphering sequence number to the RX prior to encrypted data packet communication. A sequence number accompanies each RLC PDU, which can encompass concatenated or segmented service data units (SDUs) from the higher layer PDCP. This sequence number is sufficient for the RLC to perform re-ordering, gap detection, retransmission, etc., while also allowing the RX upper layer PDCP to reconstruct a sequenced value used to encrypt content.

64 Claims, 8 Drawing Sheets

U.S. PATENT DOCUMENTS

| | | | |
|---|---|---|---|
| 2007/0291695 A1 | 12/2007 | Sammour et al. | |
| 2007/0291788 A1* | 12/2007 | Sammour et al. | 370/466 |
| 2008/0089285 A1 | 4/2008 | Pirskanen et al. | |
| 2008/0226074 A1 | 9/2008 | Sammour et al. | |
| 2008/0273551 A1 | 11/2008 | Jiang | |
| 2008/0279218 A1 | 11/2008 | Jiang | |
| 2009/0003283 A1* | 1/2009 | Meylan | 370/331 |
| 2009/0010278 A1 | 1/2009 | Torsner et al. | |
| 2009/0036061 A1 | 2/2009 | Chun et al. | |
| 2009/0207802 A1 | 8/2009 | Lee et al. | |
| 2010/0014446 A1 | 1/2010 | Chun et al. | |
| 2010/0091709 A1 | 4/2010 | Yi et al. | |
| 2010/0111106 A1 | 5/2010 | Norris et al. | |
| 2010/0128742 A1 | 5/2010 | Chun et al. | |
| 2010/0178923 A1 | 7/2010 | Yi et al. | |
| 2010/0208667 A1 | 8/2010 | Chun et al. | |

FOREIGN PATENT DOCUMENTS

| | | |
|---|---|---|
| WO | 2001024436 | 4/2001 |
| WO | WO03043259 | 5/2003 |
| WO | WO2005022812 | 3/2005 |
| WO | 2006116620 | 11/2006 |

OTHER PUBLICATIONS

Written Opinion—PCT/US08/062293, International Search Authority—European Patent Office—Aug. 21, 2008.

Nokia, Issues with RLC/MAC header structure, 3GPP TSG-RAN WG2 Meeting #55, Seoul, South Korea, Oct. 9-13, 2006, R2-062876, 3 pages.

Nokia, Ciphering for the User Plane, 3GPP TSG-RAN WG2 Meeting #57bis, St. Julian's, Malta, Mar. 26-30, 2007, R2-071241, 3 pages.

"Proposed WID for 64QAM for HSDPA", 3GPP TSG-RAN #34, RP-060846, Budapest, Hungary, Nov. 28-Dec. 1, 2006, pp. 4.

QUALCOMM Europe, "Ciphering sequence number in LTE", 3GPP TSG-RAN WG2 #58, R2-07xxxx, Kobe, Japan. pp 1-4 (May 7-11, 2007).

Alcatel-Lucent: "RLC PDU header structure in case of re-use of PDPC SN for RLC SN", 3GPP TSG RAN WG2 #58, R2-071660, <URL:http://www.3gpp.org/ftp/tsg_ran/WG2_RL2/TSGR2_58/Documents/R2-071660.zip>.

* cited by examiner

CIPHERING SEQUENCE NUMBER FOR AN ADJACENT LAYER PROTOCOL IN DATA PACKET COMMUNICATIONS

CLAIM OF PRIORITY UNDER 35 U.S.C. §119

The present application for patent claims priority to both U.S. Provisional Patent Application Ser. No. 60/915,404, entitled "CIPHERING SEQUENCE NUMBER IN LTE" filed May 1, 2007, and to U.S. Provisional Patent Application Ser. No. 60/916,261, entitled "CIPHERING SEQUENCE NUMBER IN LTE" filed May 4, 2007, both assigned to the assignee hereof and hereby expressly incorporated by reference herein.

FIELD OF INVENTION

The present disclosures pertains to data packet communication systems, and in particular to such systems in which adjacent layers of a protocol stack both require using a separate sequence number for their respective packet data units (PDUs).

BACKGROUND

Evolving communication systems such as 3GPP Long Term Evolution (LTE) achieve greater economies and reduced latencies by co-locating functions in a flat architecture, such as combining two sub-layers that are deemed part of Layer 2 of a transceiver. For instance, a Packet Data Convergence Protocol (PDCP) previously in a core entity and a radio link control (RLC) previously in a radio network controller are both now with a physical layer in an enhanced base station, so called "Evolved Base Node (eNodeB)" per 3GPP standards. This enhanced base transceiver station (BTS) provides the LTE air interlace and performs radio resource management for the evolved access system.

With such co-location of protocols, opportunities exist for distributing certain communication processes that previously were all handled by a lower layer, such as the RLC. For example, it has been recently proposed that ciphering and data compression be performed in the PDCP upper layer rather than the RLC, which handles operations such as retransmissions. While certain advantages are realized by such distribution of functions, an overhead penalty results. This distributed function in the upper layer (e.g., PDCP) requires assigning of a sequence number to a PDU by the transmitting upper layer. The sequence number is used by the receiving upper layer after the PDU for purposes such as decryption. In addition, intervening transmitter and receiver respective lower layers (e.g., RLC) require their own sequence number for re-ordering, retransmission, gap detection, etc. Moreover, the RLC can concatenate or segment the PDUs from the upper layer adding additional complications in retrieving PDUs at the receiver.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with reconstructing one of two packet data unit (PDU) sequence numbers without transmission (e.g., over the air) between a transmitter device and a receiver device. A packet data convergence protocol (PDCP) uses a ciphering sequence number associated with each PDCP PDU. The same ciphering sequence number is used to decipher the PDU. For a given cipher key, the same sequence number is advantageously used only once to avoid security weaknesses. Using the same sequence twice would generate the same key stream that is exclusive OR'ed to the data to encrypt it. Knowing one set of data that was encrypted by the key stream means it is possible to work out the second sot of data. A radio link control (RLC) service reliably indicates whether reception was successful for every RLC service data unit (SDU) submitted to the transmitter. The receiving PDCP computes the ciphering sequence number from sequencing information provided by the RLC service.

In one aspect, a method is provided for data packet communication with reduced overhead. A first sequence number is signaled from a transmitter to a receiver. A plurality of service data units (SDUs) are processed in a transmitter upper protocol with respective one of a plurality of transmitter sequence numbers sequenced from the first sequence number. A plurality of packet data units (PDUs) by a transmitter lower protocol are generated and transmitted to the receiver by incorporating the plurality of the transmitter upper protocol SDUs each associated with a transmitted sequence difference value for reconstructing the respective one of the plurality of transmitter sequence numbers at the receiver for retrieving the plurality of SDUs. The transmitted sequence difference value counts a number of upper layer SDUs transmitted by the lower protocol since the first sequence number was signaled from the transmitter to the receiver.

In another aspect, at least one processor is provided for data packet communication with reduced overhead. A first module signals a first sequence number from a transmitter to a receiver. A second module processes a plurality of service data units (SDU) in a transmitter upper protocol with respective one of a plurality of transmitter sequence numbers sequenced from the first sequence number. A third module generates and transmits to the receiver a plurality of packet data units (PDUs) by a transmitter lower protocol incorporating the plurality of the transmitter upper protocol SDUs each associated with a transmitted sequence difference value for reconstructing the respective one of the plurality of transmitter sequence numbers at the receiver for retrieving the plurality of SDUs.

In an additional aspect, a computer program product is provided for data packet communication with reduced overhead A computer readable medium comprises sets of codes for causing a computer to signal a first sequence number from a transmitter to a receiver, to process a plurality of service data units (SDU) in a transmitter upper protocol with respective one of a plurality of transmitter sequence numbers sequenced from the first sequence number, and to generate and transmit to the receiver a plurality of packet data units (PDUs) by a transmitter lower protocol incorporating the plurality of the transmitter upper protocol SDUs each associated with a transmitted sequence difference value for reconstructing the respective one of the plurality of transmitter sequence numbers at the receiver for retrieving the plurality of SDUs.

In a further aspect, an apparatus is provided for data packet communication with reduced overhead. Means are provided for signaling a first sequence number from a transmitter to a receiver. Means are provided for processing a plurality of service data units (SDU) in a transmitter upper protocol with respective one of a plurality of transmitter sequence numbers sequenced from the first sequence number. Means are provided for generating and transmitting to the receiver a plurality of packet data units (PDUs) by a transmitter lower protocol incorporating the plurality of the transmitter upper protocol SDUs each associated with a transmitted sequence difference value for reconstructing the respective one of the plurality of transmitter sequence numbers at the receiver for retrieving the plurality of SDUs.

In another additional aspect, an apparatus is provided for data packet communication with reduced overhead. A local transmitter signals a first sequence number to a remote receiver. A data packet processor processes a plurality of service data units (SDU) in a transmitter upper protocol with respective one of a plurality of transmitter sequence numbers sequenced from the first sequence number, and generates a plurality of packet data unit (PDU) by a transmitter lower protocol incorporating the plurality of the transmitter upper protocol SDU each associated with a transmitted sequence difference value for reconstructing the respective one of the plurality of transmitter sequence numbers at the receiver for retrieving the plurality of SDUs, wherein the PDUs are transmitted, to the remote receiver by the local transmitter.

In yet one other aspect, a method is provided for data packet communication with reduced overhead. A first sequence number is received from a transmitter to a receiver. A plurality of packet data units (PDUs) received at a receiver lower protocol is generated and transmitted by a transmitter lower protocol of the remote transmitter and incorporating a plurality of transmitter upper protocol service data units (SDUs) each associated with a transmitted sequence difference value. Each of the plurality of SDUs are retrieved in a receiver upper protocol from the plurality of PDUs by reconstructing a respective one of a plurality of transmitter sequence numbers sequenced from the first sequence number by the respective transmitted sequence difference value.

In yet another aspect, at least one processor is provided for data packet communication with reduced overhead. A first module receives a first sequence number from a transmitter to a receiver. A second module receives a plurality of packet data units (PDUs) at a receiver lower protocol generated and transmitted by a transmitter lower protocol of the remote transmitter and incorporating a plurality of transmitter upper protocol service data units (SDUs) each associated with a transmitted sequence difference value. A third module retrieves in a receiver upper protocol each of the plurality of SDUs from the plurality of PDUs by reconstructing a respective one of a plurality of transmitter sequence numbers sequenced from the first sequence number by the respective transmitted sequence difference value.

In yet an additional aspect, a computer program product is provided for data packet communication with reduced overhead. A computer readable medium comprises sets of codes for causing a computer to receive a first sequence number from a transmitter to a receiver, to receive a plurality of packet data units (PDUs) at a receiver lower protocol generated and transmitted by a transmitter lower protocol of the remote transmitter and incorporating a plurality of transmitter upper protocol service data units (SDUs) each associated with a transmitted sequence difference value, and to retrieve in a receiver upper protocol each of the plurality of SDUs from the plurality of PDUs by reconstructing a respective one of a plurality of transmitter sequence numbers sequenced from the first sequence number by the respective transmitted sequence difference value.

In yet a further aspect, an apparatus is provided for data packet communication with reduced overhead. Means are provided for receiving a first sequence number from a transmitter to a receiver. Means is provided for receiving a plurality of packet data units (PDUs) at a receiver lower protocol generated and transmitted by a transmitter lower protocol of the remote transmitter and incorporating a plurality of transmitter upper protocol service data units (SDUs) each associated with a transmitted sequence difference value. Means is provided for retrieving in a receiver upper protocol each of the plurality of SDUs from the plurality of PDUs by reconstructing a respective one of a plurality of transmitter sequence numbers sequenced from the first sequence number by the respective transmitted sequence difference value.

In yet another additional aspect, an apparatus is provided for data packet communication with reduced overhead. A local receiver receives a first sequence number from a remote transmitter. A data packet processor processes a plurality of packet data units (PDUs) received at a receiver lower protocol generated and transmitted by a transmitter lower protocol of the remote transmitter and incorporating a plurality of transmitter upper protocol service data units (SDUs) each associated with a transmitted sequence difference value, and for retrieving in a receiver upper protocol each of the plurality of SDUs from the plurality of PDUs by reconstructing a respective one of a plurality of transmitter sequence numbers sequenced from the first sequence number by the respective transmitted sequence difference value.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
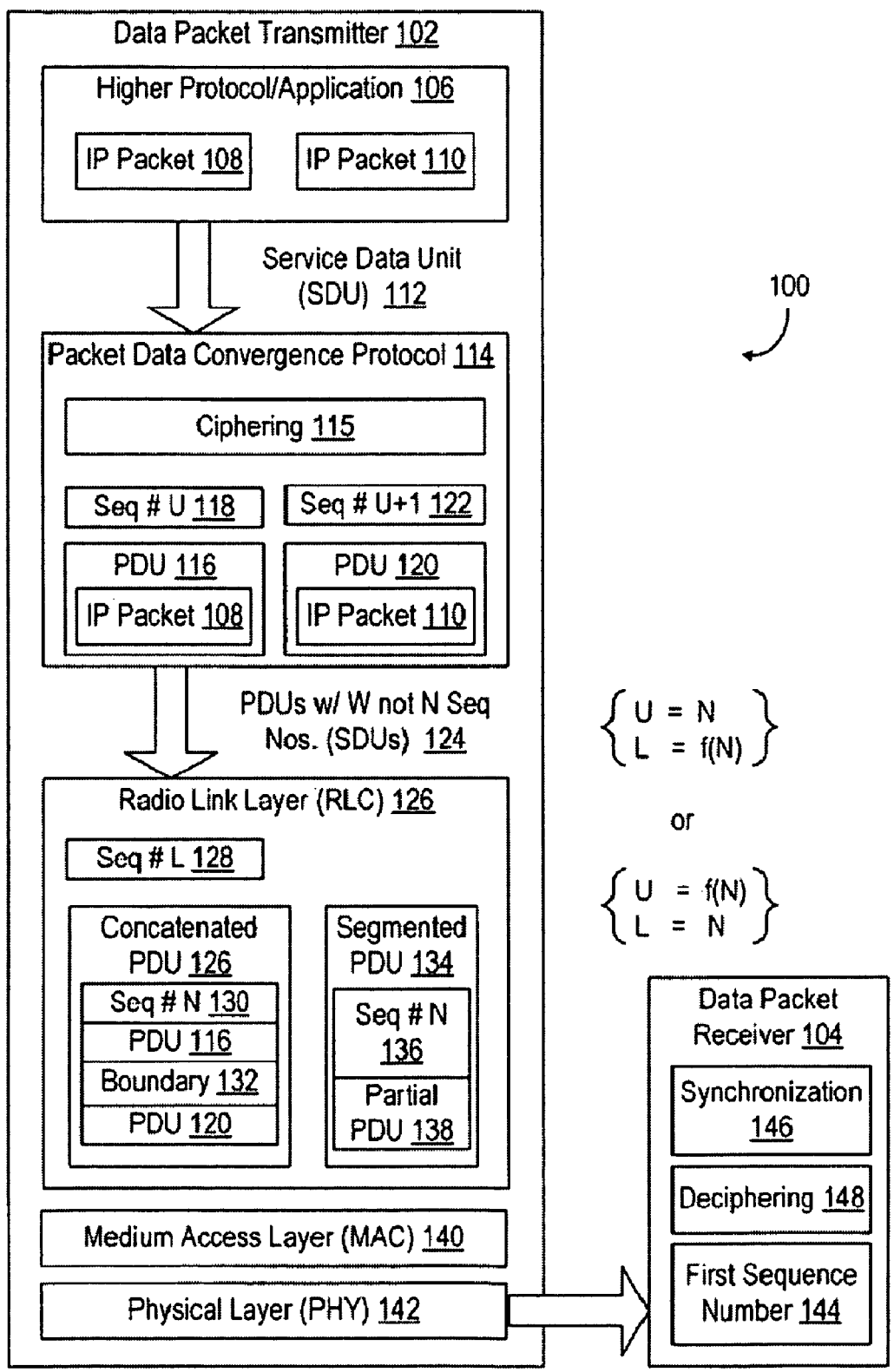
FIG. 1 illustrates a block diagram of a data packet communication system for reduced overhead wherein two layers of a protocol stack requiring separate packet sequence numbers transmit only one of the sequence number.

A data packet communication system employs data encryption in a packet data convergence protocol (PDCP) and radio link control (RLC) in Layer 2 of transmission between a transmitter (TX) and a receiver (RX). A single sequence number is used for both the PDCP and RLC to reduce overhead by signaling a TX PDCP first ciphering sequence number to the RX prior to encrypted data packet communication. A sequence number accompanies each RLC PDU, which can encompass concatenated or segmented service data units (SDUs) from the higher layer PDCP. This sequence number is sufficient for the RLC to perform re-ordering, gap detection, retransmission, etc., while also allowing the RX upper layer PDCP to reconstruct a sequenced value used to encrypt content.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects. As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), wireless telephones, wireless smartphones, wireless data cards and other electronic devices both wired and wireless.

Turning to the Drawings, in FIG. 1, a communication system 100 for data packet communication between a transmitter 102 and a receiver 104 reduces overhead by avoiding the need to transmit one of two pluralities of sequence numbers. A higher-level protocol or application 106 of the transmitter 102 has content for communication, depicted as IP packets 108, 110, that are transferred as a service data unit (SDU) 112 to an upper level protocol, depicted as a Packet Data Convergence Protocol (PDCP) 114. In an exemplary implementation, the PDCP 114 can include a ciphering component 115 that requires a sequential key for ciphering at the transmitter and deciphering at the receiver 104. This is illustrated by a first PDU 116 that is encrypted with a transmitter ciphering sequence number (TCSN), depicted as a sequence number "U" 118. The PDU 116 packages the first IP packet 108. A second PDU 120 is encrypted with another TCSN, depicted as an incremented sequence number "U" 122, and packages the second IP packet 110. The PDCP 114 transports the PDUs 116, 120 as SDUs 124 to a service access point of a lower layer protocol, depicted as a Radio Link Layer (RLC) 126.

The RLC 126 uses an RLC sequence number, depicted as "L" 128, in order for tracking receipt and retransmission and other operations. In an illustrative depiction, the RLC 126 can create a concatenated PDU 126 using a sequence number "N" 130 for performing the RLC functions. Concatenated PDU 126 sends more than one SDU 124 from the upper protocol PDCP 114, depicted as PDUs 116, 120. Boundary data 132 is specified to identify at least in part the two PDUs 116, 120. Alternatively or in addition, the RLC 126 can generate and transmit a segmented PDU 134 identified by a sequence number "N" 136 to send a partial SDU 138 from the PDCP 114. Alternatively or in addition, the RLC 126 can send a PDU (not shown) that corresponds directly to one SDU 124 received from the PDCP 114 with a directly mapped sequence number (e.g., a sequence number from the PDCP with a leading portion omitted). Alternatively or in addition, the RLC 126 can send a composite PDU (not shown) that has both concatenated and a partial SDUs 124 from the PDCP 114 in order to achieve a desired transmission size.

The PDU 126, 134 is transferred to a medium access layer (MAC) 140 then to a physical layer (PHY) 142 for transmission to the data packet receiver 104. Advantageously, transmission from the transmitter 102 to the receiver 104 includes only one sequence number to reduce overhead from which the two sequence numbers needed by the PDCP 114 and RLC 126 can be derived, depicted as either (a) U=N and L=f(N) or (b) U=f(N) and L=N. This reduced overhead is sufficient for the receiver 146 to employ a first sequence number 144 signaled from the transmitter 102 prior to exchanging encrypted data. A synchronization component 146 is thereby able to discern the appropriate sequence number needed for a deciphering component 148 to retrieve each PDU 116, 120 from the transmitter upper protocol, which is the PDCP 114.

It should be appreciated with the benefit of the present disclosure that the PDCP 114 and the RLC 126 are adjacent protocols in the 'layer two' of a telecommunication system that, among other things enable ARQ (Automatic Repeal re-Quest) as for example the RLC of HSPA and the RLC of LTE in 3GPP. Furthermore, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA is part of Universal Mobile Telecommunication System (UMTS). E-UTRA is part of the 3GPP Long Term Evolution, an upcoming release of 3GPP, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Figure 2:
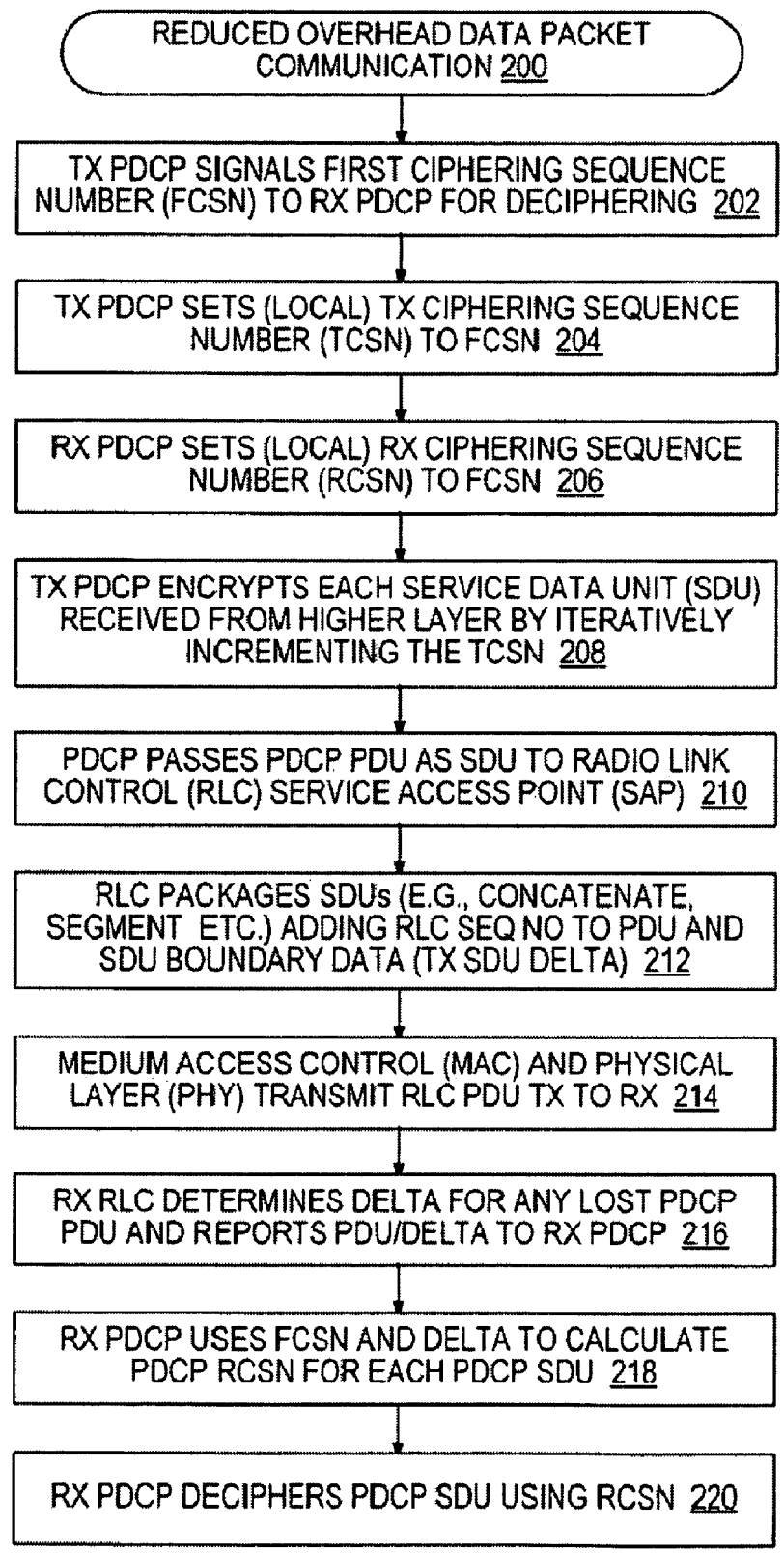
FIG. 2 illustrates a flow diagram of a methodology avoiding transmission of a ciphering sequence number that is reconstructed at a receiver for deciphering.

FIG. 2 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 2 is a flow chart of one example of a methodology 200 for reducing overhead for data packet communication. A transmitter (TX) PDCP signals a first ciphering sequence number (FCSN) to a receiver (RX) PDCP prior to using a cipher based on the FCSN (block 202) or by means of a separate signaling channel, while the cipher is already in use. The TX PDCP sets a local transmitter ciphering sequence number (TCSN) to the FCSN (block 204). The RX PDCP sets a local receiver ciphering sequence number (RCSN) to the FCSN (block 206). The TX PDCP encrypts each service data unit (SDU) received from a higher layer (e.g., application) by iteratively incrementing the TSCN (block 208) after processing a SDU. The TX PDCP passes an encrypted PDCP packet data unit (PDU) as an SDU to a service access point (SAP) of an RLC (block 210). It is noted that the TSCN is not included as part of the PDCP PDU header, however it may be indicated to the RLC SAP. RLC generates, or packages, the SDU for transmission and retransmission as required. Depending upon various considerations, this packaging can be a one-to-one relationship, a concatenation of received SDUs, a segmentation of received SDUs, or a concatenation of SDUs along with a segmented portion of an SDU. The RLC associates one RLC sequence number to each PDCP PDU. That allows RLC to perform its operations including ordered delivery, retransmissions of lost PDUs. In addition the PDCP sequence number can be maintained by means of the sequence number difference. The RLC PDU is then handled by the MAC and PHY layers for transmission from the transmitter to the receiver (block 214). The RX RLC provides the sequence number difference to the RX PDCP (block 216) which ensures the synchronization is kept even if RLC PDUs are lost. The sequence number difference between the first ciphering sequence number sent by the transmitter to the receiver is used along with that first ciphering sequence number is used to compute the RCSN (block 218). The RX PDCP deciphers the PDCP SDU using the RCSN (block 220).

Figure 3:
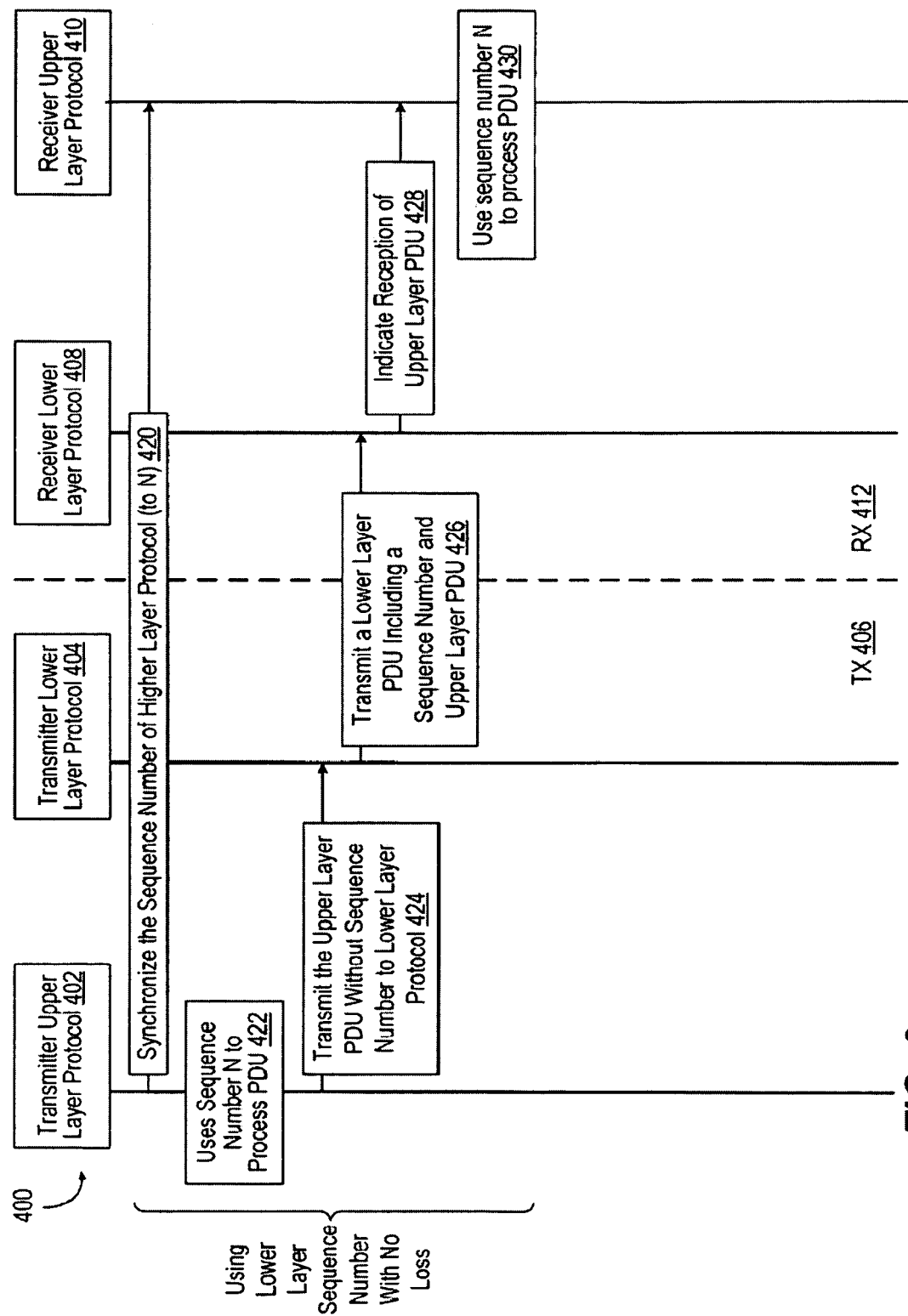
FIG. 3 illustrates a timing diagram between two transmitter layer protocols and two receiver layer protocols using a lower layer sequence number without loss.

It should be appreciated with the benefit of the present disclosure that the afore-described synchronization methodology 200 allows the receiver to take a snapshot of a ciphering sequence number (Count-c) and the RLC Sequence number (RLC_SN_0) used to carry that ciphered unit. Subsequently, the RLC delivers an SDU that has used RLC Sequence number RLC_SN_Z to PDCP. The ciphering sequence number can be computed as Current computed ciphering sequence number=Count-c+(RLC_SN_Z−RLC_SN_0). In FIG. 3, a methodology 400 is depicted as an exemplary timing diagram for using lower layer sequence number with no loss from an upper layer protocol 402 to a lower layer protocol 404 both of a transmitter (TX) 406 to lower layer protocol 408 and then to an upper layer protocol 410 both of a receiver (RX) 412. As depicted at 420, the TX upper layer protocol 402 synchronizes the RX upper layer protocol 408 by signaling the sequence number of a higher layer protocol (to N). The TX upper layer protocol 402 uses the sequence number N to process a PDU as depicted at 422 followed by transmission to the TX lower layer protocol 404 without including the sequence number as depicted at 424. In turn, the TX lower layer protocol 404 causes transmission of a lower layer PDU including a sequence number and the upper layer PDU as depicted at 426 from the transmitter 408 to the RX lower layer protocol 406 of the receiver 412. The RX lower layer protocol 408 uses its sequence number to determine receipt of upper layer PDU for reporting to the RX upper layer protocol 408 as depicted at 428. The RX upper layer protocol 408 uses the sequence number N to reconstruct the sequence number used to process (e.g., decipher) the PDU by the TX upper layer protocol 402, which in this first pass is the same number N.

Figure 4:
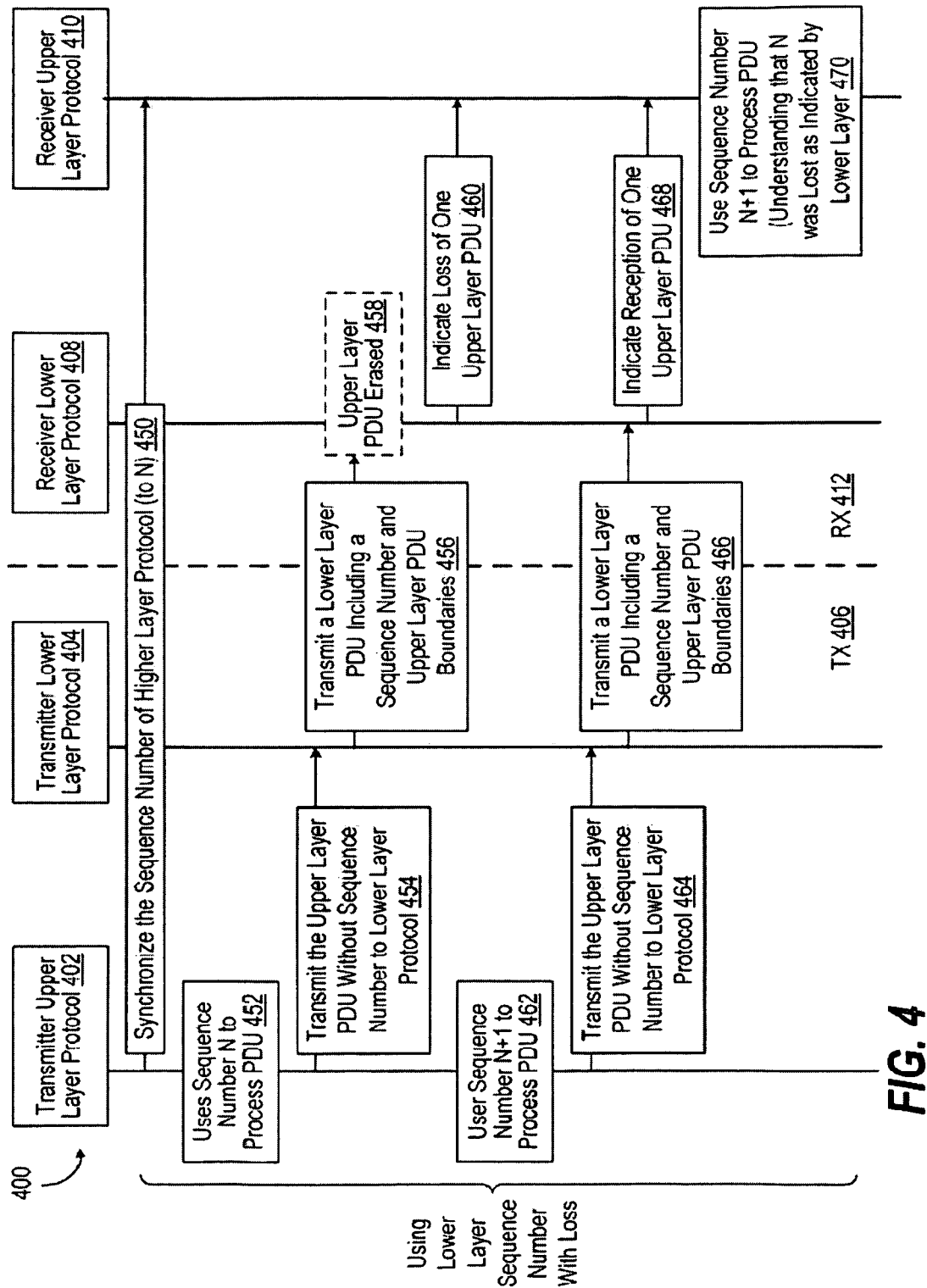
FIG. 4 illustrates a timing diagram between the two transmitter layer protocols and two receiver layer protocols of FIG. 2 with a transmission loss of a packet data unit (PDU)

In FIG. 4, to illustrate instance with data loss, the methodology 400 continues with another instance occurring when synchronization of the sequence number is required as before as depicted at 450. The TX upper layer protocol 402 uses the sequence number N to process a PDU as depicted at 452 followed by transmission to the TX lower layer protocol 404 without including the sequence number as depicted at 454. In turn, the TX lower layer protocol 404 causes transmission of a lower layer PDU including an RLC lower layer sequence number, the upper layer PDU as depicted at 456 from the transmitter 408 to the RX lower layer protocol 406 of the receiver 412. In transit, an upper layer PDU is erased as depicted at 458. The TX upper layer protocol 402 uses the incremented sequence number N+1 to process a PDU as depicted at 462 followed by transmission to the TX lower layer protocol 404 without including the sequence number as depicted at 464. In turn, the TX lower layer protocol 404 causes transmission of a lower layer PDU including an RLC sequence number and the upper layer PDU as depicted at 466 from the transmitter 408 to the RX lower layer protocol 406 of the receiver 412. The RX lower layer protocol 408 uses the sequence number of subsequently received PDUs to determine lack of receipt of an upper layer PDU for reporting to the RX upper layer protocol 408 as depicted at 460. The RX lower layer protocol 408 uses its sequence number to determine receipt of an upper layer PDU for reporting to the RX upper layer protocol 408 as depicted at 468. The RX upper layer protocol 408 uses the provided delta information based upon the RLC sequence number to reconstruct the sequence number N+1 used to process (e.g., encrypt) the PDU by the TX upper layer protocol 402.

Figure 5:
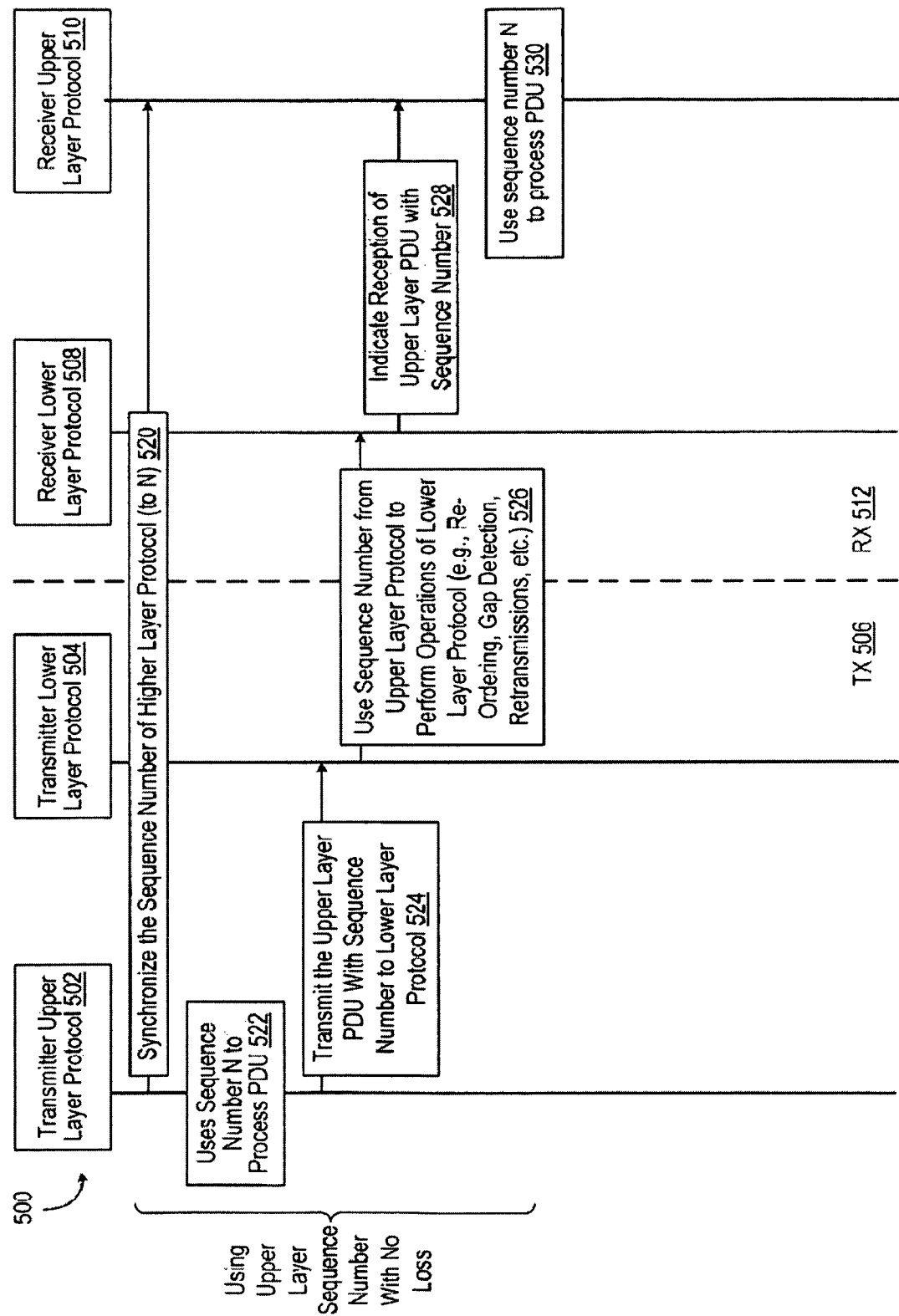
FIG. 5 illustrates a timing diagram between two transmitter layer protocols and two receiver layer protocols alternatively using an upper layer sequence number.

In FIG. 5, a methodology 500 is depicted as an exemplary timing diagram for using, an upper layer sequence number for communication from an upper layer protocol 502 to a lower layer protocol 504 both of a transmitter (TX) 506 to lower layer protocol 508 and then to an upper layer protocol 510 both of a receiver (RX) 512. As depicted at 520, the TX upper layer protocol 502 synchronizes the RX upper layer protocol 508 by signaling the complete sequence number of a higher layer protocol (to N). The TX upper layer protocol 502 uses the sequence number N to process a PDU as depicted at 522 followed by transmission to the TX lower layer protocol 504 including some or all of the least significant digits of the sequence number as depicted at 524. In turn, the TX lower layer protocol 504 causes transmission of a lower layer PDU including some or all of the least significant digits of the upper layer sequence number and the upper layer PDU as depicted at 526 from the transmitter 508 to the RX: lower layer protocol 506 of the receiver 512. Thus, a relative low overhead is required to initially synchronize using the full ciphering sequence number and then to signal a few of the least significant bits of the ciphering sequence number over the air with each ciphered packet. Those few bits of the ciphering sequence number may be carried for example in the PDCP PDU, the RLC header or the MAC header. If those bits are appended to the PDCP PDU, one can add 8 bits in order to keep; the PDU byte aligned. Alternatively these bits can be placed in the RLC or MAC header by sending a few of them (e.g., 3 bits), thereby allowing the RLC to be reset whenever desired without a need for computing a difference value "delta". The RLC functions such as reordering, gap detection, retransmission, etc. are performed with reference to the upper layer sequence number. In addition the RLC protocol performs segmentation of upper layer PDU when required for initial transmissions and retransmissions. The RX lower layer protocol 508 uses the upper layer sequence number to determine receipt of upper layer PDU for reporting to the RX upper layer protocol 508 as depicted at 528. The RX upper layer protocol 508 uses the sequence number to reconstruct the complete sequence number used to process (e.g., decipher) the PDU by the TX upper layer protocol 502.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

Figure 6:
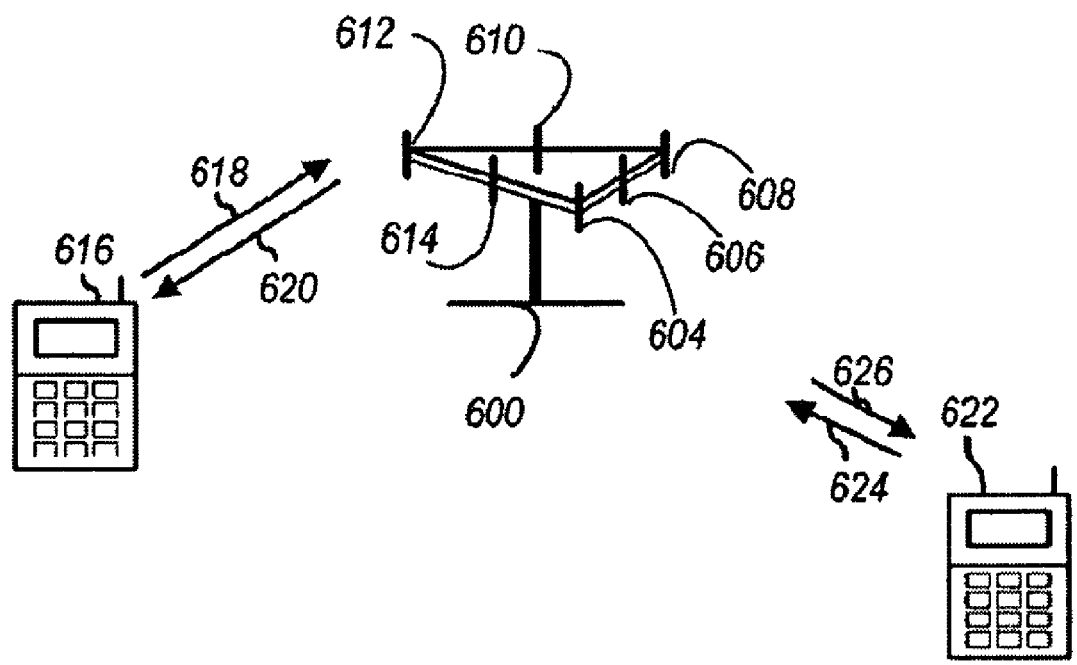
FIG. 6 illustrates a block diagram for a transmitter having modules for sending a polling command to a receiver.

Referring to FIG. 6, a multiple access wireless communication system according to one aspect is illustrated. An access point 600 (AP) includes multiple antenna groups, one including 604 and 606, another including 608 and 610, and an additional including 612 and 614. In FIG. 6, only two antennas are shown for each antenna group, however, more or fewer antennas may be utilized for each antenna group. Access terminal. 616 (AT) is in communication with antennas 612 and 614, where antennas 612 and 614 transmit information to access terminal 616 over forward link 620 and receive information from access terminal 616 over reverse link 618. Access terminal 622 is in communication with antennas 606 and 608, where antennas 606 and 608 transmit information to access terminal 622 over forward link 626 and receive information from access terminal 622 over reverse link 624. In a FDD system, communication links 618, 620, 624 and 626 may use different frequency for communication. For example, forward link 620 may use a different frequency then that used by reverse link 618.

Each group of antennas and/or the area in which they are designed to communicate is often referred to as a sector of the access point. In the aspect, antenna groups each are designed to communicate to access terminals in a sector of the areas covered by access point 600.

In communication over forward links 620 and 626, the transmitting antennas of access point 600 utilize beam forming in order to improve the signal-to-noise ratio of forward links for the different access terminals 616 and 624. In addition, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 7:
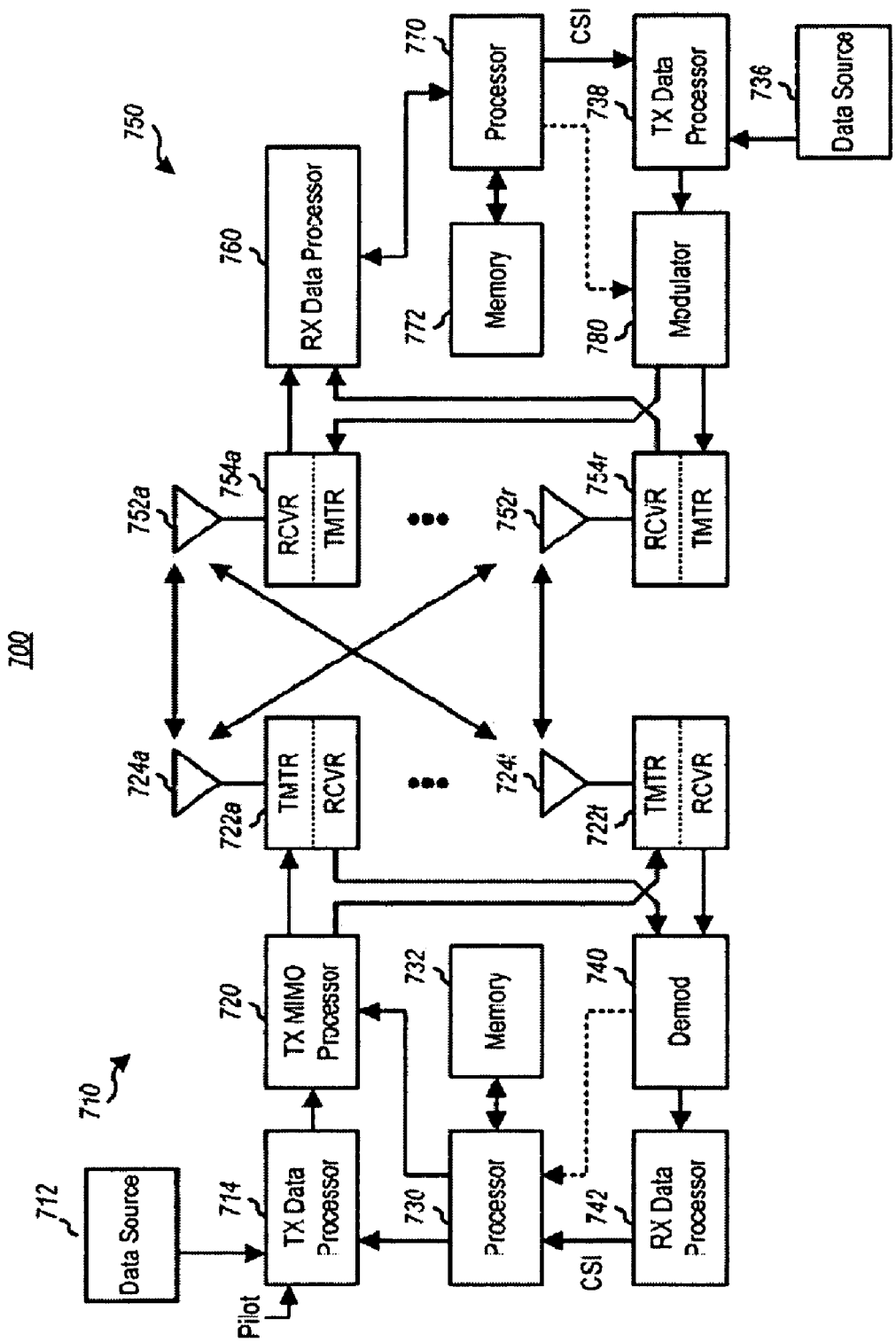
FIG. 7 illustrates a block diagram for a receiver having modules for receiving a polling command and responding with a status PDU.

FIG. 7 is a block diagram of an aspect of a transmitter system 710 (also known as the access point) and a receiver system 750 (also known as access terminal) in a MIMO system 700. At the transmitter system 710, traffic data for a number of data streams is provided from a data source 712 to a transmitter (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g. BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain implementations, TX MIMO processor 720 applies beam-forming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beam forming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH), Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 8:
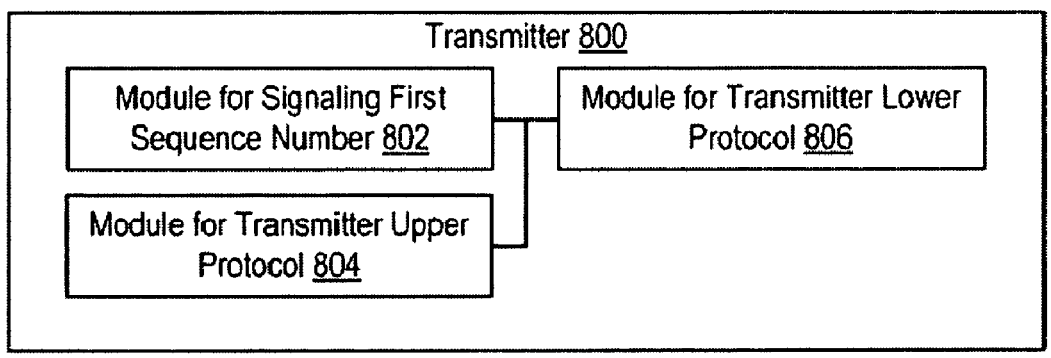
FIG. 8 illustrates a transmitter of the communication system comprising modules for reduced overhead packet transmission.

In FIG. 8, a transmitter 800 includes means, depicted as a module 802, for signaling a first sequence number from a transmitter to a receiver. The transmitter 800 includes means, depicted as a module 804, for processing a plurality of service data units (SDUs) in a transmitter upper protocol with respective one of a plurality of transmitter sequence numbers sequenced from the first sequence number. A transmitter 800 includes means, depicted as a module 806 for generating and transmitting to the receiver a plurality of packet data units (PDUs) by a transmitter lower protocol incorporating the plurality of the transmitter upper protocol SDUs each associated with a transmitted sequence delta value for reconstructing the respective one of the plurality of transmitter sequence numbers at the receiver for retrieving the plurality of SDUs.

Figure 9:
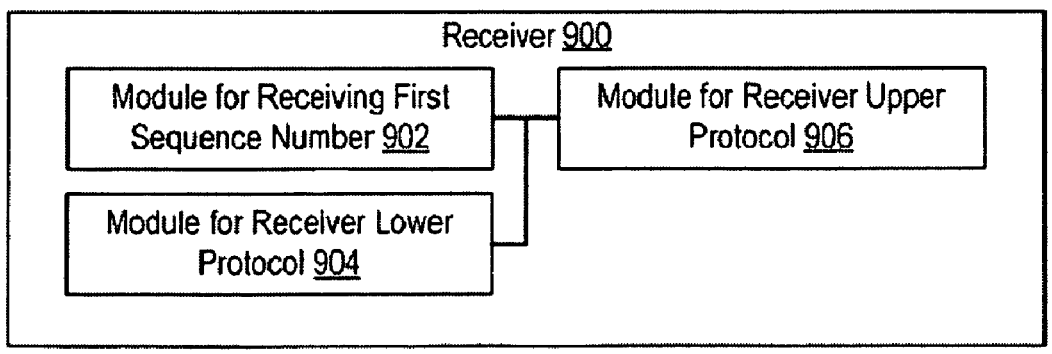
FIG. 9 illustrates a receiver of the communication system comprising modules for reduce overhead packet reception.

In FIG. 9, a receiver 900 includes means, depicted as a module 902, for receiving a first sequence number from a transmitter to a receiver. The receiver 900 includes means, depicted as a module 904, for receiving a plurality of packet data units (PDUs) at a receiver lower protocol generated and transmitted by a transmitter lower protocol of the remote transmitter and incorporating a plurality of transmitter upper protocol service data units (SDUs) each associated with a transmitted sequence delta value. The receiver 900 includes means, depicted as a module 906, for retrieving in a receiver upper protocol each of the plurality of SDUs from the plurality of PDUs by reconstructing a respective one of a plurality of transmitter sequence numbers sequenced from the first sequence number by the respective transmitted sequence delta value.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for data packet communication, comprising:
signaling a first sequence number from a transmitter to a receiver;
processing a plurality of service data units in a transmitter upper protocol with respective one of a plurality of transmitter sequence numbers sequenced from the first sequence number; and
generating and transmitting to the receiver a plurality of packet data units by a transmitter lower protocol incorporating the plurality of the transmitter upper protocol service data units each associated with a transmitted sequence difference value relating to a difference between the first sequence number and a second sequence number for reconstructing the respective one of the plurality of transmitter sequence numbers at the receiver for retrieving the plurality of service data units.

2. The method of claim 1, further comprising generating and transmitting to the receiver a packet data unit directly corresponding to the service data unit, the transmitter lower protocol incorporating a transmitted sequence difference value mapped sequentially to the plurality of transmitter sequence numbers.

3. The method of claim 2, further comprising generating a transmitted sequence value by omitting a leading portion of each transmitter sequence number.

4. The method of claim 1, wherein the sequence difference value counts a number of upper layer packet data units transmitted since the first sequence number was signaled from a transmitter to a receiver.

5. The method of claim 1, further comprising assigning one of a separate plurality of sequence numbers to each upper layer packet data unit.

6. The method of claim 5, further comprising generating and transmitting a packet data unit comprising a segmented service data unit.

7. The method of claim 5, further comprising generating and transmitting a packet data unit comprising a concatenation of at least two service data units.

8. The method of claim 7, further comprising generating and transmitting a packet data unit comprising a concatenation of at least two service data units and a segmented service data unit.

9. The method of claim 1, further comprising encrypting the service data unit in the upper protocol with the respective one of the plurality of transmitter sequence numbers sequenced from the first sequence number.

10. The method of claim 1, wherein the upper protocol comprises a packet data convergence protocol and the lower protocol comprises a radio link control.

11. The method of claim 1, wherein the transmitter comprises a selected one of a group consisting of an enhanced base node and a user equipment and the receiver comprises the other one of the group.

12. The method of claim 1, further comprising receiving a request for a retransmission based upon a receiver lower protocol detecting a missing portion in an packt data unit corresponding to a service data unit referenced by the transmitted sequence difference value.

13. The method of claim 1, wherein the receiver lower protocol provides the receiver upper protocol with an indication of the sequence difference value between an initial value and the value of the delivered upper layer service data unit.

14. At least one processor for data packet communication, comprising:
a first module for signaling a first sequence number from a transmitter to a receiver;
a second module for processing a plurality of service data units in a transmitter upper protocol with respective one of a plurality of transmitter sequence numbers sequenced from the first sequence number; and
a third module for generating and transmitting to the receiver a plurality of packet data units by a transmitter lower protocol incorporating the plurality of the transmitter upper protocol service data units each associated with a transmitted sequence difference value relating to a difference between the first sequence number and a second sequence number for reconstructing the respective one of the plurality of transmitter sequence numbers at the receiver for retrieving the plurality of service data units.

15. A computer program product for data packet communication, comprising:
a non-transitory computer readable storage medium, comprising:
a first set of codes for causing a computer to signal a first sequence number from a transmitter to a receiver;
a second set of codes for causing the computer to process a plurality of service data units in a transmitter upper protocol with respective one of a plurality of transmitter sequence numbers sequenced from the first sequence number; and
a third set of codes for causing the computer to generate and transmit to the receiver a plurality of packet data units by a transmitter lower protocol incorporating the plurality of the transmitter upper protocol service data units each associated with a transmitted sequence difference value relating to a difference between the first sequence number and a second sequence number for reconstructing the respective one of the plurality of transmitter sequence numbers at the receiver for retrieving the plurality of service data units.

16. An apparatus for data packet communication, comprising:
means for signaling a first sequence number from a transmitter to a receiver;
means for processing a plurality of service data units in a transmitter upper protocol with respective one of a plurality of transmitter sequence numbers sequenced from the first sequence number; and
means for generating and transmitting to the receiver a plurality of packet data units by a transmitter lower protocol incorporating the plurality of the transmitter upper protocol service data units each associated with a transmitted sequence difference value relating to a difference between the first sequence number and a second sequence number for reconstructing the respective one of the plurality of transmitter sequence numbers at the receiver for retrieving the plurality of service data units.

17. An apparatus for data packet communication, comprising:
a local transmitter for signaling a first sequence number to a remote receiver; and
a data packet processor for processing a plurality of service data units in a transmitter upper protocol with respective one of a plurality of transmitter sequence numbers sequenced from the first sequence number, and for generating a plurality of packet data unit by a transmitter lower protocol incorporating the plurality of the transmitter upper protocol SDU service data unit each associated with a transmitted sequence difference value relating to a difference between the first sequence number and a second sequence number for reconstructing the respective one of the plurality of transmitter sequence numbers at the receiver for retrieving the plurality of service data units wherein the packet data units are transmitted to the remote receiver by the local transmitter.

18. The apparatus of claim 17, further comprising the transmitter lower protocol of the data packet processor for generating a packet data unit directly corresponding to the service data unit by incorporating a transmitted sequence difference value mapped sequentially to the plurality of transmitter sequence numbers.

19. The apparatus of claim 18, further comprising the lower protocol of the data packet processor for generating a transmitted sequence number difference value by omitting a leading portion of each transmitter sequence number.

20. The apparatus of claim 17, wherein the sequence difference value counts a number of upper layer packet data units transmitted since the first sequence number was signaled from a transmitter to a receiver.

21. The apparatus of claim 17, further comprising the lower protocol of the data packet processor for assigning one of a separate plurality of sequence numbers to each packet data unit.

22. The apparatus of claim 21, further comprising the lower protocol of the data packet processor for generating and transmitting a packet data unit comprising a segmented service data unit.

23. The apparatus of claim 21, further comprising the lower protocol of the data packet processor for generating and transmitting a packet data unit comprising a concatenation of at least two service data units.

24. The apparatus of claim 23, further comprising the lower protocol of the data packet processor for generating and transmitting a packet data unit comprising a concatenation of at least two service data units and a segmented service data unit.

25. The apparatus of claim 17, further comprising the upper protocol of the data packet processor for encrypting the service data unit in the upper protocol with the respective one of the plurality of transmitter sequence numbers sequenced from the first sequence number.

26. The apparatus of claim 17, wherein the upper protocol of the data packet processor comprises a packet data convergence protocol and the lower protocol of the data packet processor comprises a radio link control of an enhanced base node.

27. The apparatus of claim 17, wherein the transmitter comprises a selected one of a group consisting of an enhanced base node and a user equipment and the receiver comprises the other one of the group.

28. The apparatus of claim 17, further comprising a local receiver for receiving a request for a retransmission based upon a receiver lower protocol detecting a missing portion in a packet data unit corresponding to a service data unit referenced by the transmitted sequence difference value.

29. The apparatus of claim 17, wherein the receiver lower protocol provides the receiver upper protocol with an indication of the sequence difference value between an initial value and the value of the delivered upper layer service data unit.

30. A method for data packet communication, comprising:
receiving a first sequence number from a transmitter to a receiver,
receiving a plurality of packet data units at a receiver lower protocol generated and transmitted by a transmitter lower protocol of the remote transmitter and incorporating a plurality of transmitter upper protocol service data units each associated with a transmitted sequence difference value relating to a difference between the first sequence number and a second sequence number; and
retrieving in a receiver upper protocol each of the plurality of service data units from the plurality of packet data units by reconstructing a respective one of a plurality of transmitter sequence numbers sequenced from the first sequence number by the respective transmitted sequence difference value.

31. The method of claim 30, further comprising retrieving a packet data unit directly corresponding to the service data unit, the transmitter lower protocol incorporating a transmitted sequence difference value mapped sequentially to the plurality of transmitter sequence numbers.

32. The method of claim 31, further comprising retrieving a transmitted sequence difference value by restoring an omitted leading portion of each transmitter sequence number by referencing the first sequence number.

33. The method of claim 30, wherein the sequence difference value counts a number of upper layer packet data units transmitted since the first sequence number was signaled from a transmitter to a receiver.

34. The method of claim 30, further comprising retrieving an assigned one of a separate plurality of sequence numbers for each packet data unit.

35. The method of claim 34, further comprising receiving a packet data unit comprising a segmented service data unit.

36. The method of claim 34, further comprising receiving a packet data unit comprising a concatenation of at least two service data units.

37. The method of claim 36, further comprising receiving a packet data unit comprising a concatenation of at least two service data units and a segmented service data unit.

38. The method of claim 30, further comprising decrypting the service data unit in a receiver upper protocol with the respective one of the plurality of transmitter sequence numbers sequenced from the first sequence number.

39. The method of claim 30, wherein the receiver upper protocol comprises a packet data convergence protocol and the lower protocol comprises a radio link control.

40. The method of claim 30, wherein the transmitter comprises a selected one of a group consisting of an enhanced base node and a user equipment and the receiver comprises the other one of the group.

41. The method of claim 30, further comprising transmitting a request for a retransmission based upon the receiver lower protocol detecting a missing portion in a packet data unit corresponding to a service data unit referenced by the transmitted sequence difference value.

42. The method of claim 30, wherein the receiver lower protocol provides the receiver upper protocol with an indication of the sequence difference value between an initial value and the value of the delivered upper layer service data unit.

43. At least one processor for data packet communication, comprising:
a first module for receiving a first sequence number from a transmitter to a receiver;
a second module for receiving a plurality of packet data units at a receiver lower protocol generated and transmitted by a transmitter lower protocol of the remote transmitter and incorporating a plurality of transmitter upper protocol service data units each associated with a transmitted sequence difference value relating to a difference between the first sequence number and a second sequence number; and
a third module for retrieving in a receiver upper protocol each of the plurality of service data units from the plurality of packet data units by reconstructing a respective one of a plurality of transmitter sequence numbers sequenced from the first sequence number by the respective transmitted sequence difference value.

44. A computer program product for data packet communication, comprising:
a non-transitory computer readable storage medium, comprising:
a first set of codes for causing a computer to receive a first sequence number from a transmitter to a receiver;
a second set of codes for causing the computer to receive a plurality of packet data units at a receiver lower protocol generated and transmitted by a transmitter lower protocol of the remote transmitter and incorporating a plurality of transmitter upper protocol service data units each associated with a transmitted sequence difference value relating to a difference between the first sequence number and a second sequence number; and
a third set of codes for causing the computer to retrieve in a receiver upper protocol each of the plurality of service data units from the plurality of packet data units by reconstructing a respective one of a plurality of transmitter sequence numbers sequenced from the first sequence number by the respective transmitted sequence difference value.

45. An apparatus for data packet communication, comprising:
means for receiving a first sequence number from a transmitter to a receiver;
means for receiving a plurality of packet data units at a receiver lower protocol generated and transmitted by a transmitter lower protocol of the remote transmitter and incorporating a plurality of transmitter upper protocol service data units each associated with a transmitted sequence difference value relating to a difference between the first sequence number and a second sequence number; and
means for retrieving in a receiver upper protocol each of the plurality of service data units from the plurality of packet data units by reconstructing a respective one of a plurality of transmitter sequence numbers sequenced from the first sequence number by the respective transmitted sequence difference value.

46. An apparatus for data packet communication, comprising:

a local receiver for receiving a first sequence number from a remote transmitter; and a data packet processor for processing a plurality of packet data units received at a receiver lower protocol generated and transmitted by a transmitter lower protocol of the remote transmitter and incorporating a plurality of transmitter upper protocol service data units each associated with a transmitted sequence difference value relating to a difference between the first sequence number and a second sequence number, and for retrieving in a receiver upper protocol each of the plurality of service data units from the plurality of packet data units by reconstructing a respective one of a plurality of transmitter sequence numbers sequenced from the first sequence number by the respective transmitted sequence difference value.

47. The apparatus of claim 46, further comprising the receiver lower protocol of the data packet processor for receiving a packet data unit directly corresponding to the service data unit by incorporating a transmitted sequence difference value mapped sequentially to the plurality of transmitter sequence numbers.

48. The apparatus of claim 47, further comprising the receiver lower protocol of the data packet processor for receiving a transmitted sequence difference value made by omitting a leading portion of each transmitter sequence number.

49. The apparatus of claim 46, wherein the sequence difference value counts a number of upper layer paket data units transmitted since the first sequence number was signaled from a transmitter to a receiver.

50. The apparatus of claim 46, further comprising the receiver lower protocol of the data packet processor for receiving one of a separate plurality of sequence numbers assigned to each packet data unit by the transmitter lower protocol.

51. The apparatus of claim 50, further comprising the receiver lower protocol of the data packet processor for receiving a packet data unit comprising a segmented service data unit.

52. The apparatus of claim 50, further comprising the receiver lower protocol of the data packet processor for receiving a packet data unit comprising a concatenation of at least two service data units.

53. The apparatus of claim 52, further comprising the receiver lower protocol of the data packet processor for receiving a packet data unit comprising a concatenation of at least two service data units and a segmented service data unit.

54. The apparatus of claim 46, further comprising the receiver upper protocol of the data packet processor for decrypting the service data unit with the respective one of the plurality of transmitter sequence numbers sequenced from the first sequence number.

55. The apparatus of claim 46, wherein the receiver upper protocol of the data packet processor comprises a packet data convergence protocol and the receiver lower protocol or the data packet processor comprises a radio link control.

56. The apparatus of claim 55, wherein the transmitter comprises a selected one of a group consisting of an enhanced base node and a user equipment and the receiver comprises the other one of the group.

57. The apparatus of claim 46, further comprising a local transmitter for transmitting a request for a retransmission based upon the receiver lower protocol detecting a missing portion in a packet data unit corresponding to an service data unit referenced by the transmitted sequence difference value.

58. The apparatus of claim 46, wherein the receiver lower protocol provides the receiver upper protocol with an indication of the sequence difference value between an initial value and the value of the delivered upper layer service data unit.

59. The apparatus of claim 16 further comprising means for generating and transmitting to the receiver a packet data unit directly corresponding to the service data unit, the transmitter lower protocol incorporating a transmitted sequence difference value mapped sequentially to the plurality of transmitter sequence numbers.

60. The apparatus of claim 59 further comprising means for generating a transmitted sequence value by omitting a leading portion of each transmitter sequence number.

61. The apparatus of claim 16 wherein the sequence difference value counts a number of upper layer packet data units transmitted since the first sequence number was signaled from a transmitter to a receiver.

62. The apparatus of claim 45 further comprising means for retrieving a packet data unit directly corresponding to the service data unit, the transmitter lower protocol incorporating a transmitted sequence difference value mapped sequentially to the plurality of transmitter sequence numbers.

63. The apparatus of claim 62 further comprising means for retrieving a transmitted sequence difference value by restoring an omitted leading portion of each transmitter sequence number by referencing the first sequence number.

64. The apparatus of claim 45 wherein the sequence difference value counts a number of upper layer packet data units transmitted since the first sequence number was singaled from a transmitter to a receiver.

* * * * *